(12) United States Patent
Overall et al.

(10) Patent No.: US 10,162,164 B2
(45) Date of Patent: Dec. 25, 2018

(54) FLEXION ARM MOUNT (71) Applicant: Jeff Overall, Costa Mesa, CA (US)

(72) Inventors: Jeffrey Overall, Fountain Valley, CA (US); Esteban Martinez, Huntington Beach, CA (US)

(73) Assignee: Jeff Overall, Fountain Valley, CA (US)

( * ) Notice: Subject to any disclaimer, the term of this patent is extended or adjusted under 35 U.S.C. 154(b) by 0 days.

(21) Appl. No.: 15/695,903

(22) Filed: Sep. 5, 2017

(65) Prior Publication Data

US 2017/0363852 A1 Dec. 21, 2017

(51) Int. Cl.
| | |
|---|---|
| G02B 21/36 | (2006.01) |
| G02B 23/16 | (2006.01) |
| G02B 7/32 | (2006.01) |
| G03B 17/12 | (2006.01) |
| G03B 17/56 | (2006.01) |
| G02B 7/105 | (2006.01) |

(52) U.S. Cl.
CPC ............ G02B 21/362 (2013.01); G02B 7/32 (2013.01); G02B 23/16 (2013.01); G03B 17/12 (2013.01); G03B 17/566 (2013.01); G02B 7/105 (2013.01)

(58) Field of Classification Search
USPC ........................ 396/342, 448, 544
See application file for complete search history.

(56) References Cited

U.S. PATENT DOCUMENTS

| | | | |
|---|---|---|---|
| 5,040,011 A | 8/1991 | Tiffen | |
| 5,053,794 A | 10/1991 | Benz | |
| 5,070,407 A | 12/1991 | Wheeler | |
| 5,208,624 A | 5/1993 | MacKay | |
| 5,299,067 A | 3/1994 | Kutz | |
| 5,396,487 A | 3/1995 | Abe | |
| 5,457,577 A | 10/1995 | Wilson | |
| 6,381,081 B1 | 4/2002 | Ford | |
| 6,441,975 B1 | 8/2002 | Ebert | |
| 8,087,558 B2 | 1/2012 | Tsai | |
| 8,593,745 B2 * | 11/2013 | O'Neill | G02B 7/14 359/819 |
| 8,602,662 B1 * | 12/2013 | Mans | F16M 11/041 248/160 |
| 8,620,152 B1 * | 12/2013 | Martin | G02B 15/10 248/121 |
| 8,620,153 B2 | 12/2013 | Overall | |
| 2013/0028591 A1 * | 1/2013 | Hicks | G03B 41/00 396/544 |
| 2015/0293430 A1 * | 10/2015 | O'Neill | G03B 17/565 396/544 |
| 2017/0308115 A1 * | 10/2017 | Fukuda | G06F 1/163 |

OTHER PUBLICATIONS

"Why You'll Wear a Body Camera." TechWorld, www.techworld.com.au/article/print/626812/why-II-wear-body-camera/.

* cited by examiner

Primary Examiner — Clayton E Laballe
Assistant Examiner — Warren K Fenwick (57) ABSTRACT

A method for attaching camera filters and other light transmissive elements using flexural rigidity. A flexion arm enables coupling with cameras and other devices in areas non-proximate to a lens. A frame conjoined with the flexion arm enables attachment of the camera filter to a camera lens or lens housing.

8 Claims, 7 Drawing Sheets

FLEXION ARM MOUNT

TECHNICAL FIELD

The present invention relates to methods and devices for attaching accessories to cameras, Specifically, it relates to the removably attaching light transmissive, elements and other optical devices to a camera lens or lens housing.

LIST OF PRIOR ART

The following is a list of prior art that presently appears relevant;
U.S. Pat. Nos.

| Pat. No.: | Kind Code: | Grant Date: | Patentee: |
|---|---|---|---|
| 5,053,794 | A | 1991 Oct. 1 | Benz |
| 5,040,011 | A | 1991 Aug. 13 | Tiffen |
| 5,070,407 | A | 1991 Dec. 3 | Wheeler |
| 5,208,624 | A | 1993 May 4 | MacKay |
| 5,299,067 | A | 1994 Mar. 29 | Kutz |
| 5,396,487 | A | 1995 Mar. 7 | Abe |
| 5,457,577 | A | 1995 Oct. 10 | Wilson |
| 6,381,081 | B1 | 2002 Apr. 30 | Ford |
| 6,441,975 | B1 | 2002 Aug. 27 | Ebert |
| 8,087,558 | B2 | 2012 Jan. 3 | Tsai |
| 8,593,745 | B2 | 2013 Nov. 26 | O'Neill |
| 8,620,153 | B2 | 2013 Dec. 31 | Overall |

Nonpatent Literature Documents
"Why You'll Wear a Body Camera," TechWorld, www.techworld.com.au/article/print/625812/why-][-wear-body-camera/.

BACKGROUND/DISCUSSION OF PRIOR ART

Camera filters have long been used to improve the quality of photographs and video footage. Camera filters allow a user to improve image quality in a variety of settings. When in use, camera filters must be removably attached to the camera lens or lens housing. Advancements in camera technology have enabled a decrease in size of cameras and lenses, with concurrent improvements in quality. Cameras can now be configured to the dimensions best suited to their desired function. This enables cameras, both video graphic and photographic, to be affixed and integrated into a variety of objects and devices. Specifically, improved camera and gimbal technology has seen the integration of camera systems into aerial drones and other unmanned vehicles. Cameras are now used in an array of circumstances and the need for versatility in coupling camera filters and optical devices has increased.

Many methods have been developed for directly coupling camera filters to a camera lens or lens housing, The use of threading, adhesive, magnets, pressure fitting, and other methods have all been used to attach filters directly to a lens and lens housing. With the integration and attachment of cameras to a greater variety of devices these methods are often no longer adequate or optimal. Variety in camera size and shape often make it problematic to couple the filters directly to the camera lens or lens housing. Many cameras do not permit coupling by threading or magnetism. Drone camera systems may be recessed, prevent complete encirclement of the camera or coupling by means mentioned above.

The present invention allows removable coupling to a remote area on the camera or object the camera is integrated into or affixed to. This enables the filter to be attached when it cannot be directly coupled solely with the lens or lens housing. A flexion arm conjoined with the filter frame enables remote coupling. The flexion arm removably couples with the camera using by external pressure created by flexural rigidity. The flexion arm extends from the lens filter element to the desired location of coupling, allowing versatility in coupling the filter to the camera or other object in areas non-proximate to the lens. This allows attachment when the lens, lens housing, or camera does not permit coupling by the methods discussed earlier, or it is not optimal to couple the filter directly to or around the lens. It also eliminates the need to permanently or temporarily attach the filter by use of adhesives, which can damage the lens and camera, and leave residue.

The flexion arm allows quicker installation and removal than coupling by hooking, threading or other more invasive methods of coupling. The flexion arm requires no permanent alteration to the camera. The ability to couple is not dependent on the material the coupled with object is made from, as the flexion arm is configured to exert external pressure on the object as coupling means.

SUMMARY

A method for attaching a camera filter to a lens or camera lens housing using a flexion arm or arms is disclosed. The flexion arm is made of metal, polycarbonate, or other material capable of flexural rigidity, or bending stiffness. The exemplary flexion arm is comprised of 6061-T6 aluminum alloy.

When the flexion arm is moved from its unstressed position it exerts force back in the direction of the unstressed position. This force is used to couple with an object. The material can exert sufficient pressure towards its unstressed position when compressed or expanded at a stress level less than its yield stress. Aluminum alloy, polycarbonate and other metallic materials may permit sufficient yield stress to allow repeated manipulation from the unstressed position without significant decline of structural integrity, i.e. alteration of the unstressed dimensions. The flexion arm is configured to contour to the camera. Camera is used to denote cameras or other devices to which a camera may be integrated into or attached to. The flexion arm expands to facilitate attachment and removal from the camera. The flexion arm is coupled with a frame. In the exemplary embodiment, the frame is attached by riveting. The frame is conjoined with the light transmissive element, i.e. a camera filter, or other optical device. The frame is configured to abut the camera lens or camera lens housing.

The flexion arm has six sides. The six sides consist of two surfaces and four intermediate sidewalls. The surfaces may be rectangular. One surface, referred to herein as the coupling surface, is configured to abut and place pressure on the coupled object. The four sidewalls may consist of two long sidewalls and two short sidewalls. The flexion arm may abut and couple with the frame along one short sidewall (referred to herein as "coupled short sidewall") and an adjacent area of the coupling surface. The uncoupled short sidewall (referred to herein as the "free short sidewall") remains free to extend to and engage a device.

The flexion arm may be arc-shaped in its unstressed position. In the arc configuration the long sidewalls arc in confluence with the surfaces. The two shorter sidewalls may remain flat in the arced configuration.

An exemplary flexion arm is configured to be slightly smaller than the dimensions of the object it couples with. This enables exertion of force when removably attached.

External force is used to expand and install the flexion arm mount on the camera. The flexion arm may press, slid, or snap over the camera. The flexion arm expands to facilitate attachment and removal from the camera. When external pressure ceases, the flexion arm attempts to return to its unstressed position, exerts pressure on the coupled object, and couples with the camera. External force created by flexural rigidity allows the flexion arm to couple with the camera. The pressure exerted by the flexion arm secures the frame and light transmissive element in a stationary position over the lens or lens housing.

An exemplary embodiment has one flexion arm. Alternate embodiments can include a plurality of flexion arms. While one flexion arm is sufficient to couple the filter, additional flexion arms can augment coupling when the camera restricts extension of a single flexion arm. Multiple arms can allow greater coupling capacity with objects of certain materials and dimensions. Additional flexion arms comprised of material allowing for flexural rigidity.

Alternate embodiments can include additional means of coupling to augment the coupling ability of the flexion arm. Hooks, snap-hooks, or other mechanisms could be used to reinforce non proximate coupling to the camera. The augmented coupling mechanism may couple with the free short sidewall and extend perpendicularly or obliquely therefrom. The augmented coupling mechanism may provide stability and resistance from movement in a direction transverse to the pressure exerted by the flexion arm.

Alternate embodiments can include ventilation openings on the flexion arm or arms. Cameras and other devices to which the flexion arm can be attached produce electrical heat. The openings would provide ventilation, keeping the camera cooler and reducing heat conduction by the flexion arm mount.

The exemplary embodiment is utilized to attach a light transmissive element over the lens. In alternative embodiments lens caps and other camera accessories could be attached by the flexion arm.

Although the description above contains many specificities, these should not be construed as limiting the scope of the embodiments but as merely providing illustrations of some of several embodiments. Thus, the scope of the embodiments should be determined by the appended claims and their legal equivalents, rather than by the examples given.

BRIEF DESCRIPTION OF THE DRAWINGS

An exemplary embodiment of the invention will now be discussed with reference to the following figures. These figures are provided for illustrative purposes only. The invention is not limited to the subject matter illustrated in the figures.

DRAWING: LIST OF REFERENCE NUMERALS 11 flexion arm mount
21 flexion arm
22 frame
23 light transmissive element
24 additional flexion arm
25 coupling surface
26 exposed surface
31 lens
32 camera body
41 augmented coupling mechanism
42 rivets
43 coupled Short Sidewall
44 free short sidewall
51 ventilation opening

DETAILED DESCRIPTION OF DRAWING

Figure 1A:
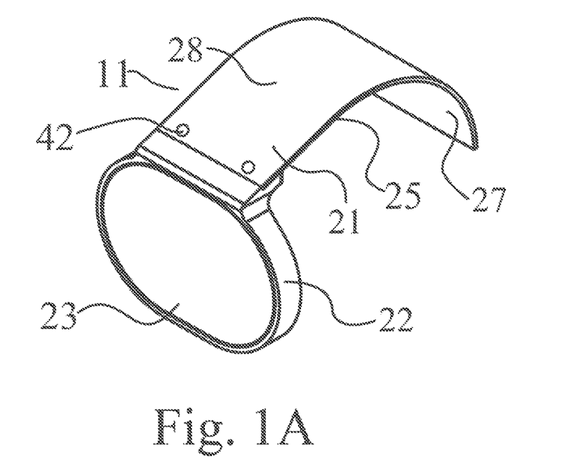
FIG. 1A shows a top perspective view of the invention.
Figure 1B:
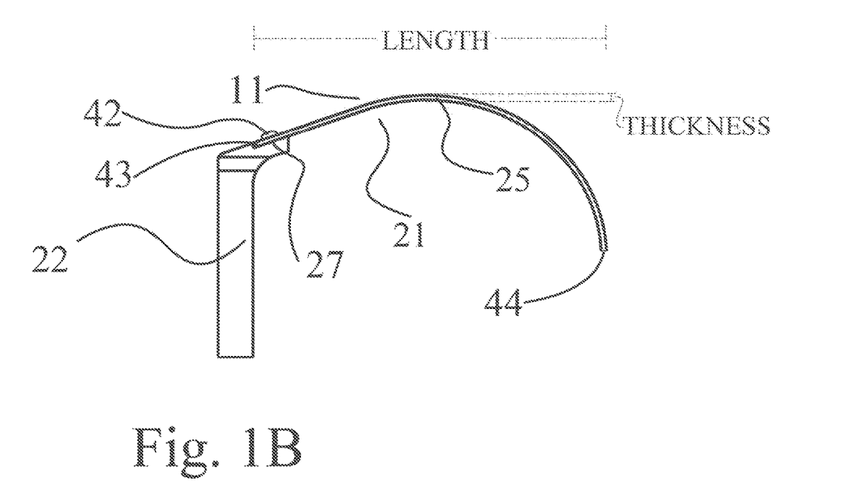
FIG. 1B shows a planal side view of the invention.

A flexion arm 21 conjoined with a frame 22. A light transmissive element 23 can be seen in the front of the embodiment depicted in FIG. 1A. Rivets 42 are the means of coupling the flexion arm 21 to a frame element 22 in this embodiment. Two long sidewalls 25 extend away from the frame 22 element. A coupling surface 27 and an exposed surface 28 oppose each other and extend away from the frame 22. FIG. 1B depicts the arc configuration of the exemplary flexion arm 21. The flexion arm 21 is curved along the rectangular surfaces 27, 28 and the corresponding longer sidewalls 25. Flexural rigidity allows the flexion arm 21 to move from this unstressed position for attachment and removal. The flexion arm 21 embodiment in FIG. 1A-1D is attached to the top of the frame 22. A coupled short sidewall 43 and the proximate area coupling surface 27 area abut the frame 22 to allow coupling by rivets 42. The free short sidewall 26 is at the terminus of the flexion arm 21 and is uncoupled in an isolated state. The flexion arm 21 may be attached on any sides or sides of the frame 22.

The unstressed flexion arm 21 forms an arc in this embodiment. This allows coupling with relatively round or multidimensional surfaces that cannot be completely surrounded. The short sidewalls 43, 44 remain straight in this embodiment.

Figure 1C:
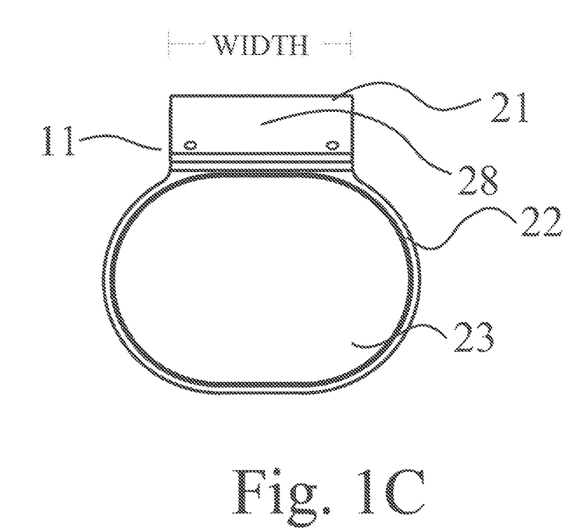
FIG. 1C shows a bottom perspective view of the invention.
Figure 1D:
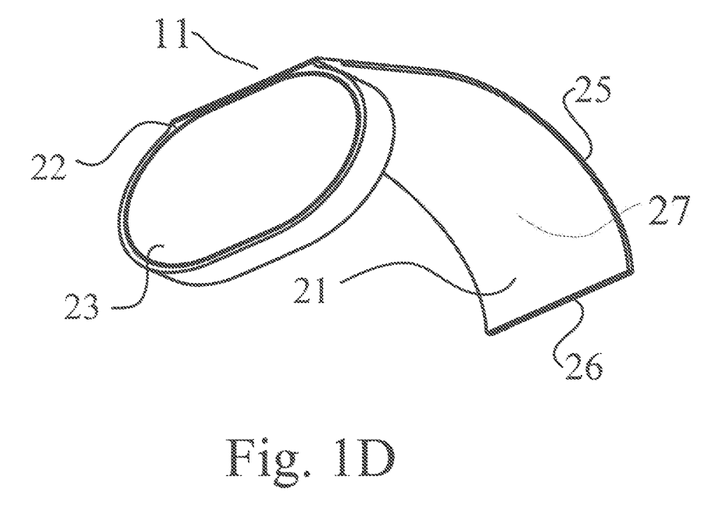
FIG. 1D shows a front view of the invention.
Figure 1E:
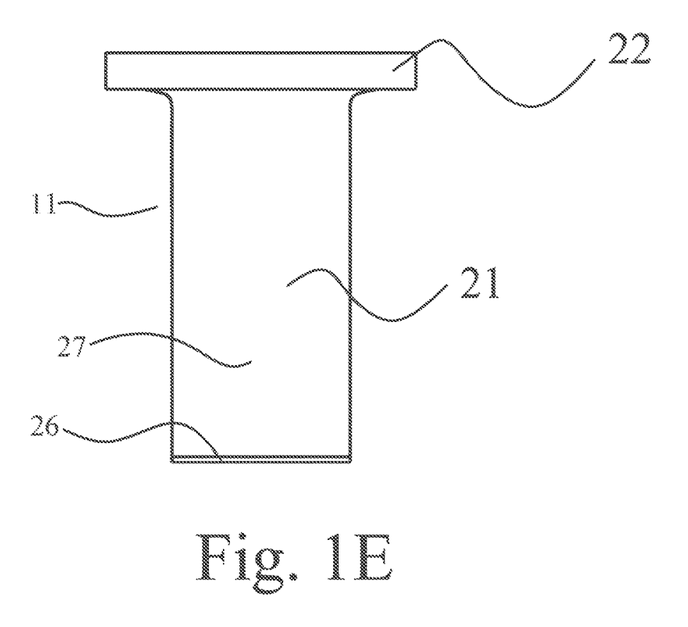
FIG. 1E shows a bottom view of the invention.

In some embodiments the flexion arm 21 will have a length (as shown in FIG. 1B) between 15 mm and 60 mm, a width (as shown in FIG. 1C) between 5 mm and 25 mm, and a height between 5 mm and 20 mm. However, the flexion arm 21, may have other dimensions. The thickness of the flexion arm may be between 0.1 mm and 5 mm, depending on the material and necessary yield stress.

The coupled sidewall 43 and adjacent area of the coupling surface 27 abut the frame 22. The rivets 42, couple the coupling sidewall and the coupling surface with the frame 22. In this embodiment the frame 22 is recessed to allow alignment of the exposed surface of the flexion arm 21 and top of the frame 22.

Figure 2A:
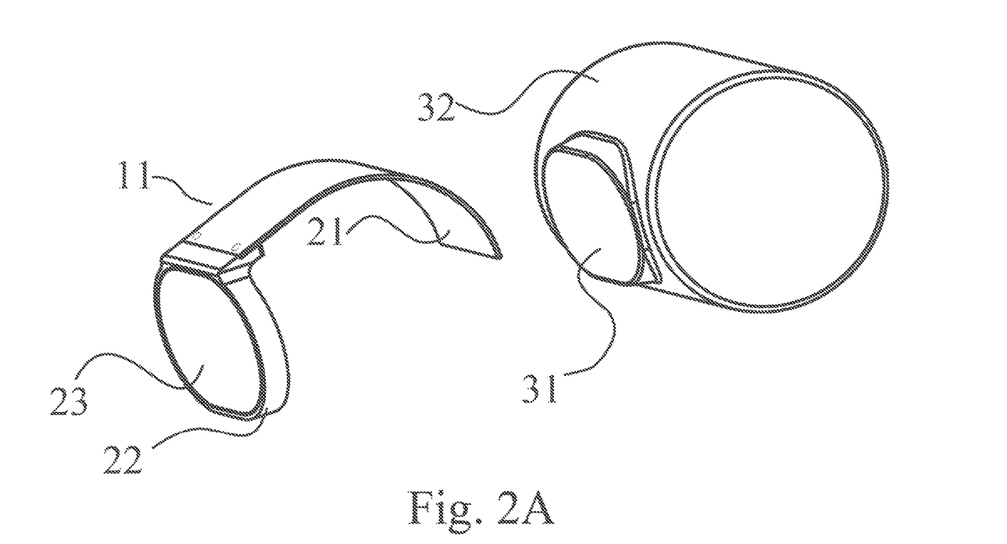
FIG. 2A shows the flexion arm mount detached from a camera.

FIG. 1C shows the light transmissive element 23 conjoined with the frame 22. The coupling surface 27 of the flexion arm 21 can be seen in FIG. 1D. The flexion arm 21 is configured to conform to the camera or object when mounted and expanded from its unstressed position. FIG. 2A shows the flexion arm mount 11 detached from a lens 31 and camera 32. The flexion arm 21 is configured to allow attachment through flexural rigidity with the camera body 32. The free short sidewall 44 and the frame 22 are moved away from each other to create the necessary expansion for installation. The frame 22 and light transmissive element 23 are configured to fit the lens or lens housing.

Figure 2B:
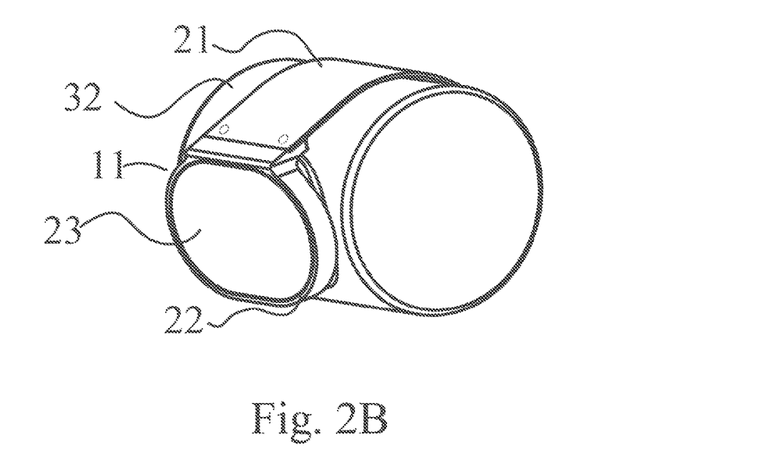
FIG. 2B shows the flexion arm mount coupled with a camera.

FIG. 2B shows the flexion arm mount 11 coupled to the lens 31 and camera 32. The frame 22 securely abuts the lens or lens housing. The flexion arm 21 contours and exerts pressure on the camera body 32 to couple.

Figure 2C:
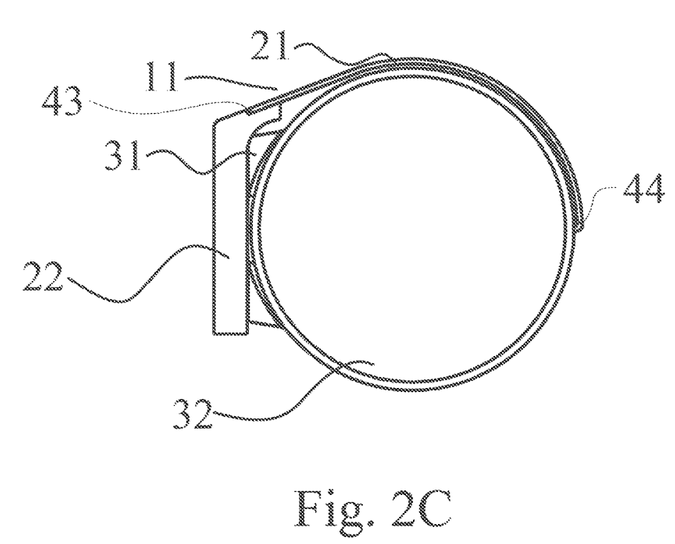
FIG. 2C shows a side view of the flexion arm mount coupled to a camera

FIG. 2C shows a side view of the flexion arm 21 coupled with the camera body 32. In this embodiment the flexion arm 22 is flush with the camera body 32. The flexion arm 21 is expanded, with the free short sidewall 44 further from the frame 22 than in the unstressed position. The coupling surface 27 (not visible) abuts the camera body 32. The flexion arm 21 attempts to return to the unstressed position and as a result exerts pressure on the camera body 32. The free short sidewall 44 extends to the back of the camera body 32. This view demonstrates the flexion arm's 21 capability to couple with cameras and other objects it is not possible or practical to completely surround, i.e. close around or encircle. Other embodiments can use additional coupling mechanisms. When attached, the frame 22 and light transmissive element 23 align and abut with the lens or lens housing of the camera, holding the lens stationary.

FIG. 2A-2C show the flexion arm mount 11 mounted on cylindrical camera 32 and lens 31. Other embodiments of the flexion arm 21 can be configured to fit cameras or surfaces of different dimensions. The frame 22 and light transmissive element 23 may be configured to fit lens or lens housings of a different shapes.

Figure 3:
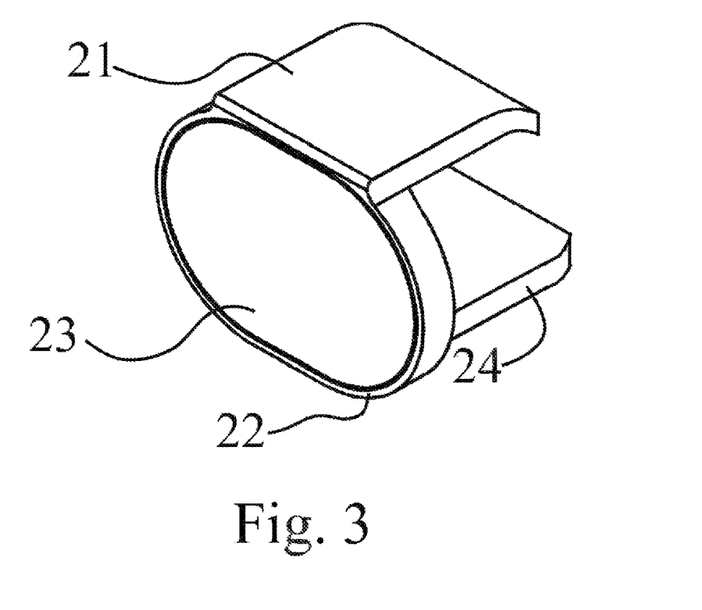
FIG. 3 shows an embodiment with a plurality of flexion arms

Alternate embodiments may include additional flexion arms as depicted in FIG. 3. The additional flexion arm 24 enables more secure coupling with objects, permitting coupling on multiple surfaces. FIG. 3 shows a flexion arm 21 and an additional flexion arm 24 of different lengths than embodiment in FIG. 1A-1D. Flexion arm dimension may be adjusted based on the camera or object to be coupled.

Figure 4:
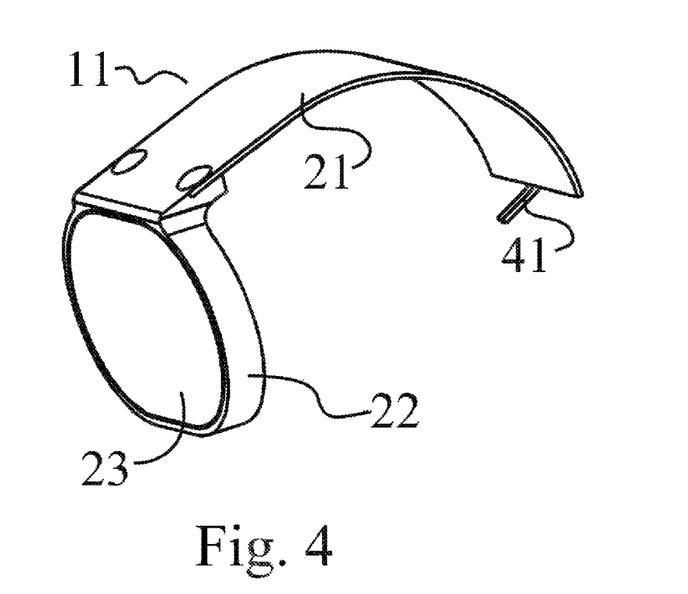
FIG. 4 shows an embodiment with an augmented coupling mechanism

FIG. 4 shows the flexion arm mount 11 with augmented coupling mechanism 41. The augmented coupling mechanism 41 is conjoined with the flexion arm 21. In this embodiment the augmented coupling mechanism 41 is perpendicular to the flexion arm 21. In some situations, an augmented coupling mechanism 41 or plurality of augmented coupling mechanisms will better stabilize the flexion arm mount 11 and aid the flexion arm 21 in attaching the lens. The augmented coupling mechanism 41 may extend perpendicularly or obliquely from the flexion arm 21 to provide resistance from transverse movement relative to the external pressure exerted by the coupling surface 27. The augmented coupling mechanism may be the same material as the flexion arm 21 and integrally coupled with the flexion arm 21. The augmented coupling mechanism 41 may have a length (L) between 1 mm and 10 mm and a height (H) between 0.01 mm and 5 mm. The width of the augmented coupling mechanism 41 may be between 0.05 mm and 25 mm.

Figure 5:
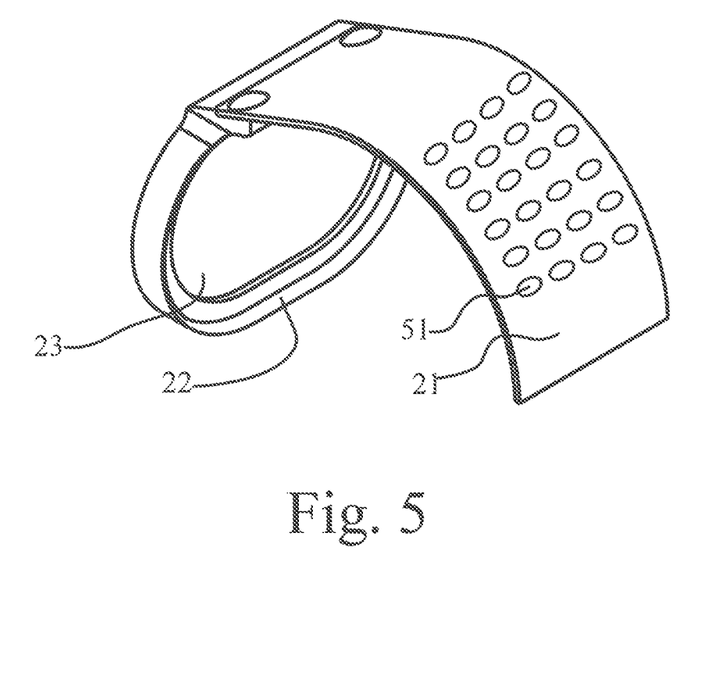
FIG. 5 shows an embodiment with a plurality of ventilation openings

FIG. 5 shows a flexion arm mount 11 with a plurality of ventilation openings 51 in the flexion arm 21. The ventilation openings 51 are placed on the flexion arm 21 to allow the escape of heat produced by cameras, drones and other electronic devices, When the flexion arm 21 is comprised of a heat conducting material the ventilation openings 51 may also reduce heat transfer and conduction.

What is claimed is:

1. A method of attaching an optical device, comprising:
    a. A light transmissive element, a frame, and a flexion arm;
    b. said flexion arm being comprised of two surfaces and four interposing sidewalls, two sidewalls being relatively shorter and two sidewalls being relatively longer;
    c. said flexion arm abutting and coupling with said frame at one shorter sidewall and the adjacent surface area of said flexion arm,
    d. said flexion arm is comprised of material capable of flexural rigidity,
    e. said flexion arm can move from an unstressed position, and exerts force toward the unstressed position when so moved, Whereby, said light transmissive object is attached to a camera lens or lens housing.

2. The method recited in claim 1, wherein there are a plurality of flexion arms.

3. The method in claim 1, there is at least one augmented coupling mechanism coupled with a sidewall and extended therefrom.

4. The method recited in claim 1, wherein the flexion arm is comprised of an aluminum alloy.

5. The device in claim 4, wherein the flexion arm arcs along the rectangular surfaces and the corresponding long sidewalls.

6. The device recited in claim 4, wherein the flexion arm is comprised of aluminum alloy.

7. The method recited in claim 4, wherein there are a plurality of flexion arms.

8. A device for coupling a camera filter to an object not capable of being completely surrounded, comprising:
    a. A flexion arm comprised two opposing relatively rectangular surfaces, and two short sidewalls and two long sidewalls interposing said surfaces;
    b. Said flexion arm being curved in it's unstressed position, c. Said flexion arm comprised of material capable of movement from an unstressed position and exerting force in the direction of the unstressed position when so manipulated;
    d. A frame;
    e. Said flexion arm abutting with the frame along one of the shorter sidewalls and a portion of at least one of the surfaces adjacent to said shorter sidewall;
    f. The two relatively long sidewalls extending away from the frame and terminating at the free short sidewall.

* * * * *